Figure 1:
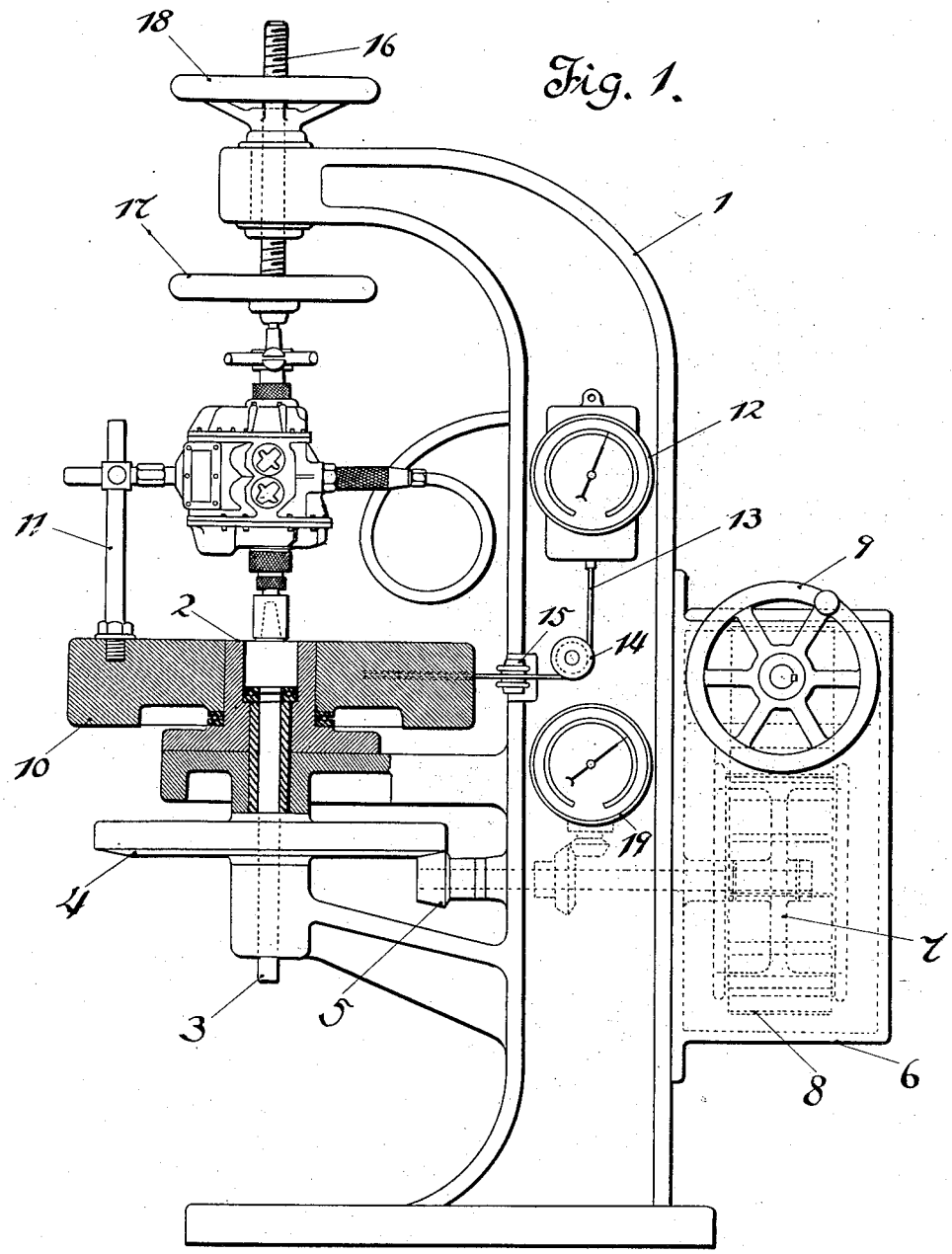

Sept. 12, 1933.  T. TAKAHASHI  1,926,825
APPARATUS FOR TESTING DRILLS
Filed Aug. 26, 1929  4 Sheets-Sheet 2

INVENTOR
TATSUMI TAKAHASHI
BY
ATTORNEYS

Sept. 12, 1933.   T. TAKAHASHI   1,926,825
APPARATUS FOR TESTING DRILLS
Filed Aug. 26, 1929   4 Sheets-Sheet 3

INVENTOR
TATSUMI TAKAHASHI
BY
ATTORNEYS

Patented Sept. 12, 1933

1,926,825

UNITED STATES PATENT OFFICE 1,926,825

APPARATUS FOR TESTING DRILLS

Tatsumi Takahashi, Higashi-Ku, Osaka, Japan

Application August 26, 1929, Serial No. 388,286
and in Japan September 3, 1928

4 Claims. (Cl. 265—24)

This invention relates to an improvement in equipment for examining and discovering the characteristics peculiar to individual pneumatic or electric drills and aims to provide a device of a simple construction which will enable us to find out the peculiarities of individual drills, electric or pneumatic, in relation to three points, namely—torque, revolving speed, and effective horse power of the drill shaft, simultaneously, easily, quickly, and without the necessity of working out any calculations; thus enhancing the efficiency in testing, at a time, of a large number of pneumatic or electric drills as compared with the processes hitherto known.

According to the invention, firstly, the reaction torque on the body of a pneumatic drill, to be tested, which is caused by its own operation is transmitted to a free revolving block which freely revolves, independently of the revolving motion of the said drill shaft about the axis of the drill shaft of the said drill; secondly, the torque on the said block transmitted from the body of the said drill under operation is measured by a spring balance fixed to the frame on one end, and on the other coupled to a suitable part of the block, and moreover the load on the drill shaft is suitably regulated to any required degree by adjusting the resistance of a brake equipment by the manipulation of a hand-wheel attached to the said equipment.

Under the conditions above stated, the torque on the drill shaft of a pneumatic drill to be tested being equivalent to the load on the spring balance I can at once make the load on the drill shaft to any desired degree by manipulating the hand-wheel and watching at the same time the indication by the needle of the said spring balance so that the change in the revolving speed of the drill shaft corresponding to the change of the load on the drill shaft can be examined quickly, easily and very accurately.

There is another advantage for this device in that the characteristic curves of a pneumatic drill to be tested which consist of revolving speed, torque and effective horse power of the drill shaft can be automatically recorded on a paper during the testing process by means of a specially constructed recording needle attached to the tachometer which moves correspondingly to the revolving speed of the drill shaft which is registered on the recording plate attached to a part of the moving portion of the spring balance, the load thereon representing the torque generated or developed by the drill shaft.

It is to be added, though perhaps unnecessary, that the above-mentioned equipment can, of course be applied to any electric drill, the main construction of which is not dissimilar to a pneumatic drill.

Figure 2:
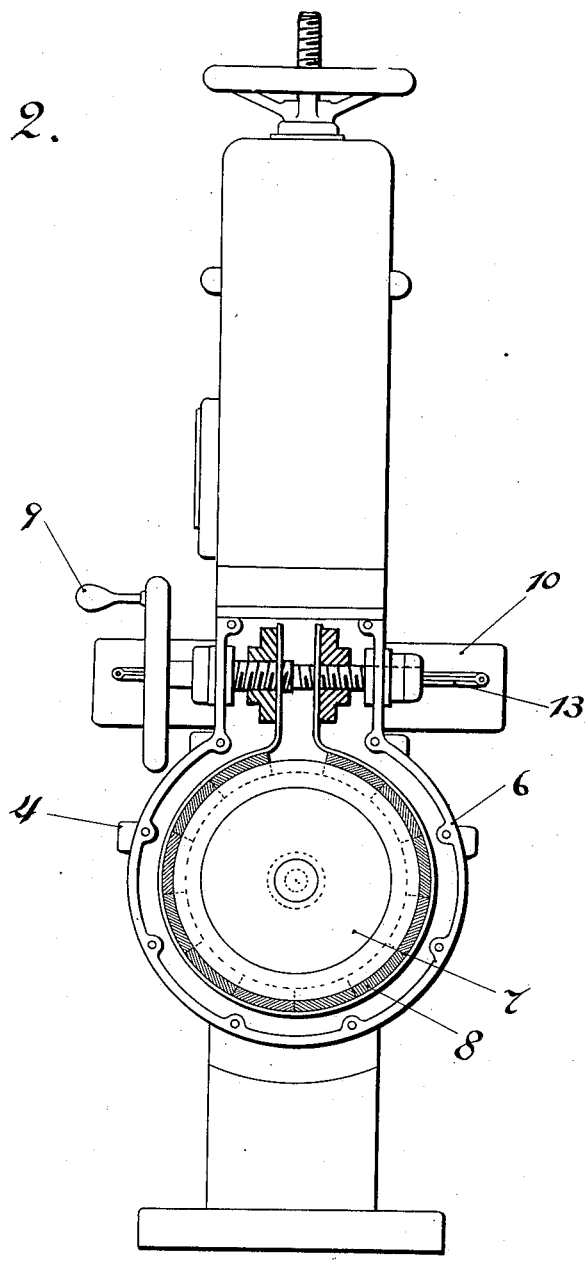
Figure 3:
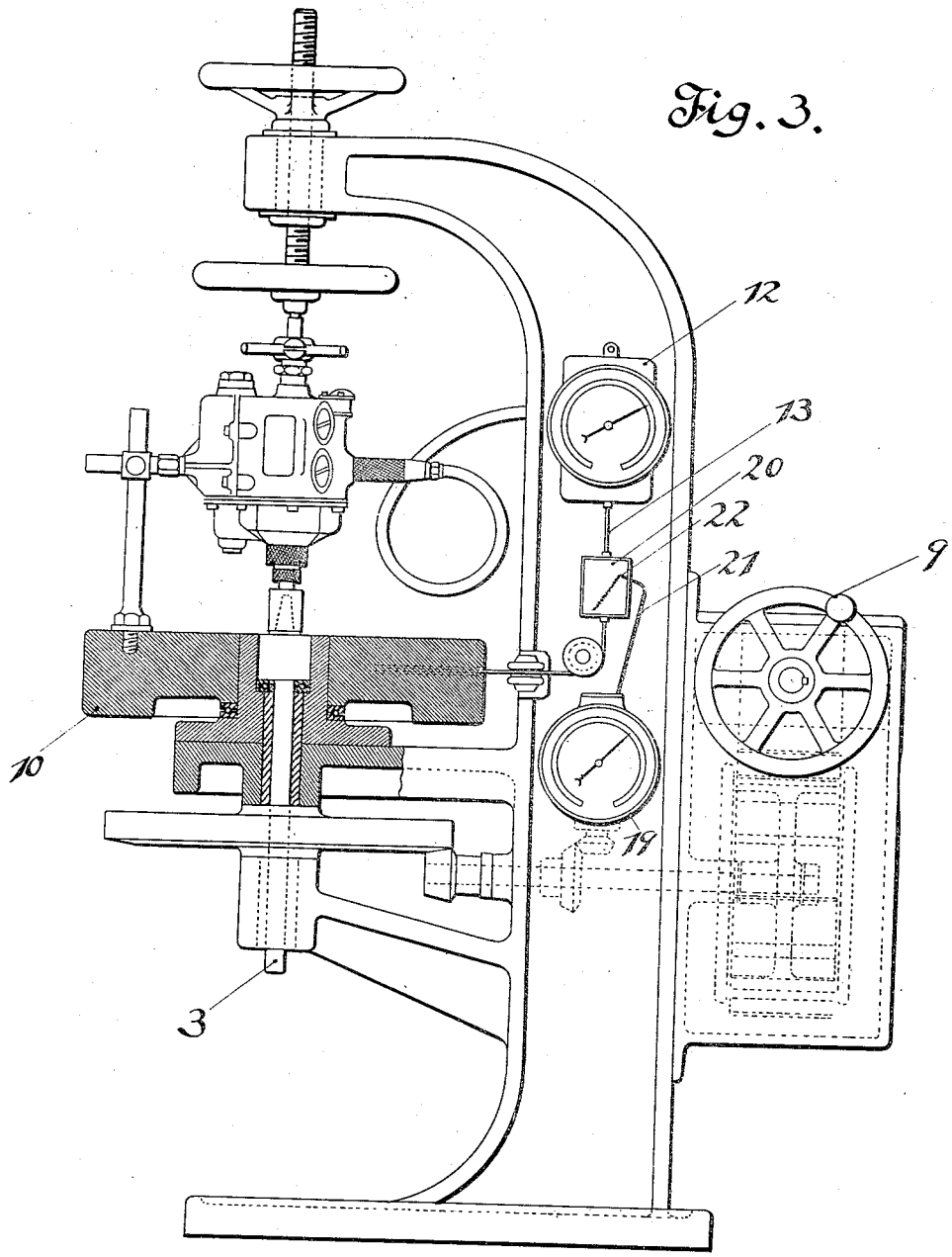
Figure 4:
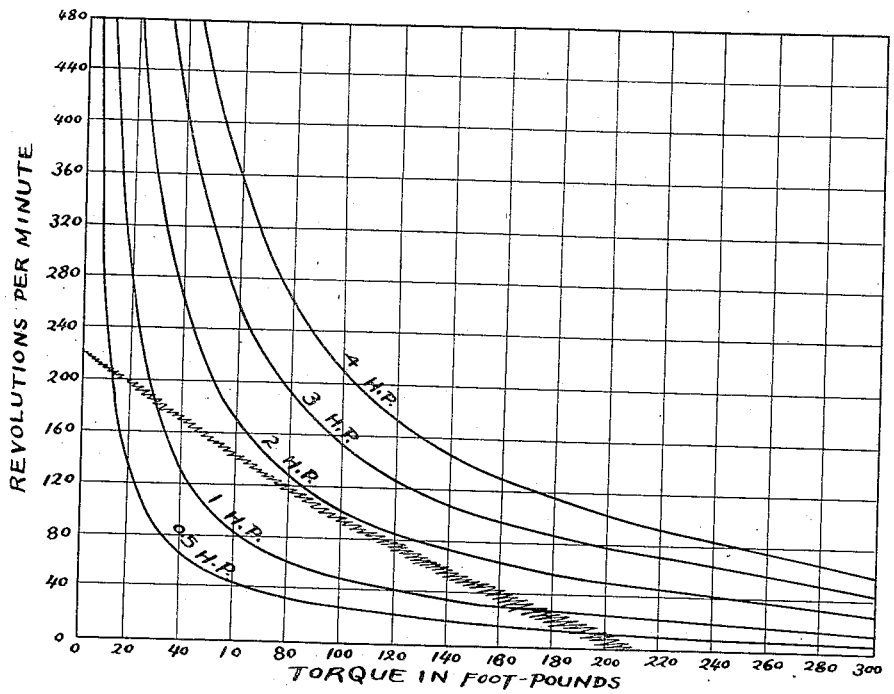

The annexed drawings show the device of the present invention. Fig. 1 shows the frontal view of the machine a part of which is cut in a vertical section; Fig. 2, a lateral view of the machine showing the adjusting contrivance of the friction brake; Fig. 3, the recording device attached to a part of the machine which automatically registers, on a paper, the characteristic curve of a pneumatic drill to be tested which consists of revolving speed torque and effective horse power of the drill shaft; and Fig. 4 shows an example of automatic record of the characteristic curves developed by a pneumatic drill tested.

A fixed spindle (2) is rigidly fixed to a part of the frame (1), the middle portion of which part forms a bearing hole through which a driving shaft (3) runs.

The upper end of the said driving shaft is connected with the drill shaft of the pneumatic drill to be tested, the revolving motion of which is transmitted, through the gears (4) (5), to the brake wheel (7) which is provided in a case (6) fixed to the frame (1) and the revolving speed of the driving shaft (3) is controlled by the friction brake (8) the load borne by which is made to be, easily, freely and continuously adjusted to any desired degree by the manipulation of the hand wheel (9) attached to the said friction brake (8).

During the testing process, the brake-wheel is revolved in a cooling liquid contained in the case (6) in order that the sudden rise of temperature which may otherwise be caused by the effect of the braking load on the wheel (7) may be properly prevented.

On the outside of the said fixed spindle (2) is fitted a cylindrical freely revolving block (10) which is made to revolve freely around the centre line of the driving shaft (3) at right angles to the axis of revolution of the driving shaft (3) which is also the axis of the fixed spindle (2).

A pole (11) is erected on cylindrical block (10) for transmitting the reaction torque on the body of the drill to be tested, which is caused by the operation of the drill itself to the free revolving block (10) through the handle of the drill as shown in the drawings. Further, a spring balance (12) is provided having its one end hung on the frame (1) and its other end joined to a rope (13) which is wound round the cylindrical free revolving block (10) after passing over the rollers (14) and (15).

The object of this part of the mechanism is to transmit, to the spring balance (12), the turning moment of the said free revolving block (10), which is due to the reaction torque exerted on the body of the pneumatic drill resulting from the load on the driving shaft (3) so that the turning moment of the free revolving block (10) thus caused, is made to be resisted by or balanced to the load on the spring balance (12).

Furthermore, the frame (1) is provided with a screw spindle (16) mounted on its top and positioned in axial alignment with the driving shaft (3), which is made to be moved up and down freely by means of a feeding handle (17) along the said line of centre so that the body of the pneumatic drill to be tested can be supported at the top of its feed spindle by the end of the screw spindle (16) in such a manner that the said pneumatic drill is allowed to rotate around the axis of the drill shaft, said axis being at the same time the axis of the driving shaft (3) and of the screw spindle (16).

The screw spindle (16) remains completely fixed to the frame (1) by a lock handle (18) during the operation of the pneumatic drill to be tested.

The device is so constructed that the change in the revolving speed of the driving shaft corresponding to the change in the load on the drill shaft is indicated clearly from time to time by a tachometer (19).

To describe the process of working the machine, the extreme end of the drill shaft of the pneumatic drill to be tested is connected to the upper end of the driving shaft (3) of the testing equipment and the top of the feed spindle of the drill is made to be supported by the end of the screw spindle (16) which is tightly fitted to the frame (1) by the lock handle (18), besides, the dead handle is connected to the pole (11) erected on a part of the free revolving block (10) as shown in Fig. 1.

Thus equipped, the pneumatic drill is made to start its own work; so the reaction torque on the body of the pneumatic drill to be tested which is caused by its own operation is firstly transmitted to the free revolving block (10) through the handle of the drill and the pole (11) erected on the free revolving block (10), and secondly, through the rope (13) to the spring balance (12) one end of which is hung on the frame (1) and the other joined to the end of the said rope (13) with the result that the above-mentioned reaction torque generated on the body of the pneumatic drill is resisted to or balanced by the resistance or the load of the said spring balance (12) through the handle of the drill.

It is noted that the angular displacements of the free revolving block (10) correspond to the change in the load on the said spring balance (12) or on the said driving shaft (3), the load indicated by the spring balance (12) being always proportionate to the turning moment transmitted to the free revolving block (10) so that the observer can at once read from register of the said spring balance (12) the exact turning moment developed in the drill shaft of the pneumatic drill under test.

And further, inasmuch as the load on the driving shaft (3) can easily be regulated by adjusting the load on the brake wheel, we can freely and continuously vary the indication or register on the said spring balance to any desired degree during the operation of the pneumatic drill by properly manipulating the hand-wheel (9) which is provided in the said friction brake (8).

By the above process, the observer can, in a very short space of time and most accurately, find out the variations in the revolving speed of the drill shaft resulting from the total variation of the load exerted on the drill shaft of the pneumatic drill, which will enable him to study and ascertain quickly and easily the peculiarities manifested by the individual pneumatic drill tested.

It is a special characteristic of this testing machine that the indication shown by the spring balance is always absolutely equivalent to the turning moment exerted on the drill shaft of a pneumatic drill under test, as the indication by the spring balance (12) is always caused by the load of the frictional resistance occurring at any moving parts between the top of the driving shaft (3) and the brake-wheel (7) as well as the braking resistance exerted on the brake-wheel (7). And it is to be noted that, for this test, the spring balance (12) is always loaded statically which prevents quick fluctuations of the indicating needle and its machine parts, owing to the inertia effect of the free revolving block (10), which also prevents the characteristic curves automatically recorded on a paper, from being so highly fluctuated that the correct delineation becomes difficult to be found out.

There is another feature of the testing machine in that the tests for the motion of the drill in both running directions forward and backward are executed without any intermission owing to the fact that by using two lines of ropes, the ends of which connect the free revolving block (10) with the spring balance (12) on one hand, and on the other are wound in opposite directions round the block, transmission to the spring balance, of the turning moment of the free revolving block (10) is always made by one of the rope lines according as the running direction of the drill shaft is forward or backward so that once a pneumatic drill is fitted to the machine, the test proceeds in all its phases without the trouble of shifting the position of the drill.

In a modification shown in Figure 3, a recording plate (20) is attached to the middle portion of the rope (13), one end of said rope being connected with the spring balance (12), while the other end is connected with the block (10) in substantially the same manner as shown in Figures 1 and 2. The plate (20) is displaced by the movement of the rope (13), said movement corresponding to the change in the load of the spring balance (12).

The tachometer (19) is provided with a needle (21), the top point (22) of which moves with respect to the recording plate (20), approximately at right angles to the direction of the movement of said plate (20) according to the change in the revolving speed of the drill shaft.

It will be seen that when a pneumatic drill is thus tested by gradually changing the load it sustains from maximum to nil by manipulation of the hand-wheel (9), the change in the revolving speed of the drill shaft due to the change of the load is automatically recorded by the needle (21) upon the recording plate (20) so that the change in the effective horse power due to the change of the load can also easily be known from the delineations recorded.

Fig. 4 shows an example of delineations upon the said plate (20) recorded in the manner above described; the abscissa of the recorded graph being generated by the lineal displacements of rope (13) represent the loads exerted by the drill shaft, and the ordinate generated by the lineal displacements of the recording needle (21) of the tachometer (19) represent the revolving speed of the drill shaft.

Thus, the change in the effective horse power corresponding to the change in the loads sustained by the drill shaft can also be easily known from the corresponding horse power curves printed on the recording paper.

With the recent development in the application of compressed air, pneumatic drills have also extended their scope of applications so that they have become indispensable not only to general architecture, bridge construction, boiler making, car building and other industries but particularly vital to the ship-building industry.

It is therefore becoming a matter of utmost importance that the research for, and improvements in, the mechanism of pneumatic drills should be fully carried out, for a great deal in efficiency of production depends upon the question of whether the testing of pneumatic drills at the time of purchase, and the periodical inspection afterwards are rationally done or not, in view of which, the present conditions reveal the regrettable fact that the above two points have, as yet, not reached the stage of rationalization not only in America but also in Europe.

This is mainly owing to the fact that in the testing methods hitherto known, the method of the Prony brake is generally applied in all cases of tests which involves comparatively a good deal of time and trouble, particularly in working out the calculations from the results obtained from the test.

For example, to complete a test for both forward and backward revolutions of a pneumatic drill once by the methods at present known requires at least one hour or sometimes as much as two, so that where a large number of pneumatic drills are used, the method of testing by such a system as a Prony brake causes great practical difficulties; to add to which the result shown does not include the power lost in friction by the resistance against the movements of the bearings and other moving parts which ought to be entered into calculations for such a machine of small horse power like a pneumatic drill.

By the present invention the above defects are remedied, for the reason that the testing machine hereinbefore described indicates, clearly and accurately and in a few minutes, the individual characteristics of a pneumatic drill relating to both forward and backward revolutions under the loads sustained from maximum to nil. The time can still further be shortened to one or two minutes if the spring balance and tachometer are so disposed as to record automatically their respective movements of the needle on the same recording paper which will entirely eliminate human errors from the reading of records, thus securing the greatest reliability on the result obtained. The construction of the testing machine hereinbefore described is merely one form of application, among many, of the present invention within the spirit of which a part or parts of the construction may of course be modified: especially it is to be noted in view of the extended use of electric drills that a more accurate and reliable test than that at present known will be obtained for them by application of this testing machine, the subject of the present invention.

What I claim is:

1. A pneumatic drill testing machine, comprising a rotatably mounted block, said block being adapted to revolve about the axis of the drill shaft of the pneumatic drill to be tested, a member attached to said block and adapted to come into contact with a part of the body of said pneumatic drill for the purpose of rotating said block together with said drill, means indicating the turning moment of said block caused by the operation of said drill, a brake equipment, and means transmitting the action of said brake equipment to said drill shaft, the last-mentioned means comprising a shaft positively connected with said drill shaft during the testing operation.

2. A pneumatic drill testing machine, comprising a frame, a block rotatably mounted on said frame, said block being adapted to revolve about the axis of the drill shaft of the pneumatic drill to be tested, a member attached to said block and adapted to come into contact with a part of said pneumatic drill for the purpose of rotating said block together with said drill, a spring balance fixed on one end to said frame, a recording plate, means connecting said plate with a movable part of said spring balance, means connecting said recording plate with said block, means to record automatically on said recording plate the revolving speed of the drill shaft corresponding to the load on said spring balance, a brake equipment, and means transmitting the action of said brake equipment to said drill shaft, the last-mentioned means comprising a shaft positively connected with said drill shaft during the testing operation.

3. A pneumatic drill testing machine, comprising a frame, a block rotatably mounted on said frame, said block being adapted to revolve about the axis of the drill shaft of the pneumatic drill to be tested, a pole fixed on said block and adapted to come into contact with a part of the body of said pneumatic drill for the purpose of rotating said block together with said drill, a spring balance fixed on one end to said frame, means connecting said spring balance with said block, a brake equipment, and means transmitting the action of said brake equipment to said drill shaft, the last-mentioned means comprising a shaft positively connected with said drill shaft during the testing operation.

4. A pneumatic drill testing machine, comprising a frame, a block rotatably mounted on said frame, said block being adapted to revolve about the axis of the drill shaft of the pneumatic drill to be tested, a pole fixed on said block and adapted to come into contact with a portion of the body of said pneumatic drill for the purpose of rotating said block together with said drill, means indicating the turning moment of said block caused by the operation of said drill, a brake equipment, means transmitting the action of said brake equipment to said drill shaft, and a tachometer connected with the last-mentioned means and carried by said frame.

TATSUMI TAKAHASHI.